United States Patent
Hori et al.

(10) Patent No.: US 10,335,894 B2
(45) Date of Patent: Jul. 2, 2019

(54) JOINING METHOD

(71) Applicant: NIPPON LIGHT METAL COMPANY, LTD., Shinagawa-ku, Tokyo (JP)

(72) Inventors: Hisashi Hori, Shizuoka (JP); Nobushiro Seo, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 7 days.

(21) Appl. No.: 14/605,638

(22) Filed: Jan. 26, 2015

(65) Prior Publication Data
US 2015/0209893 A1   Jul. 30, 2015

(30) Foreign Application Priority Data

Jan. 27, 2014  (JP) .................................. 2014-012551
Apr. 1, 2014   (JP) .................................. 2014-075625
May 26, 2014   (JP) .................................. 2014-107666

(51) Int. Cl.
  *B23K 20/12*   (2006.01)
  *B23K 103/04*  (2006.01)

(52) U.S. Cl.
  CPC ........ *B23K 20/1225* (2013.01); *B23K 20/122* (2013.01); *B23K 20/1265* (2013.01); *B23K 2103/04* (2018.08)

(58) Field of Classification Search
  None
  See application file for complete search history.

(56) References Cited

U.S. PATENT DOCUMENTS 6,302,315 B1 * 10/2001 Thompson ........... B23K 20/123
                                              228/112.1
8,164,021 B1 *  4/2012 Ferrando ............ B23K 20/1255
                                              219/78.13
(Continued)

FOREIGN PATENT DOCUMENTS

CN     101281006 A    10/2008
CN     101281007 A    10/2008
(Continued)

OTHER PUBLICATIONS

Extended European Search Report for EP Application No. 15188909 dated Jan. 15, 2016 (7 pages).
(Continued)

*Primary Examiner* — Devang R Patel
(74) *Attorney, Agent, or Firm* — Merchant & Gould P.C.

(57) ABSTRACT

A joining method includes a butting process configured to butt a first metal member and a second metal member each having a front surface with various heights to form therebetween a butt portion with various heights; and a welding process configured to apply a friction stirring to the butt portion by a stirring pin of a rotation tool while only the stirring pin of the rotation tool contacts with the first metal member and the second metal member of the butt portion. The welding process may be configured to insert the stirring pin of the rotation tool into the butt portion from front surfaces of the first metal member and the second metal member and apply the friction stirring to the butt portion while an insertion depth of only the stirring pin is kept approximately constant.

6 Claims, 10 Drawing Sheets

(56) References Cited

U.S. PATENT DOCUMENTS

| | | | |
|---|---|---|---|
| 2003/0024965 A1* | 2/2003 | Okamura | B23K 20/122 228/112.1 |
| 2003/0028281 A1* | 2/2003 | Adams | B23K 20/123 700/212 |
| 2006/0086775 A1 | 4/2006 | Trapp et al. | |
| 2007/0187466 A1* | 8/2007 | Sayama | B23K 20/126 228/101 |
| 2008/0245516 A1 | 10/2008 | Ishikawa et al. | |
| 2008/0245517 A1 | 10/2008 | Ishikawa et al. | |
| 2009/0188968 A1* | 7/2009 | Marie | B23K 20/122 228/112.1 |
| 2013/0126138 A1 | 5/2013 | Seo et al. | |

FOREIGN PATENT DOCUMENTS

| | | | |
|---|---|---|---|
| CN | 101657289 A | | 2/2010 |
| CN | 101952079 A | | 1/2011 |
| CN | 102036779 A | | 4/2011 |
| CN | 102056700 A | | 5/2011 |
| CN | 102390011 A | | 3/2012 |
| EP | 1864747 A1 | | 12/2007 |
| EP | 2 551 049 A1 | | 1/2013 |
| EP | 2 745 972 A1 | | 6/2014 |
| FR | 2900082 | | 10/2007 |
| JP | 2001198683 | | 7/2001 |
| JP | 2002-079383 | | 3/2002 |
| JP | 2004-314115 A | | 11/2004 |
| JP | 2007111747 | | 5/2007 |
| JP | 2007160370 A | * | 6/2007 |
| JP | 2008-290092 | | 12/2008 |
| JP | 2009-090297 A | | 4/2009 |
| JP | 2009241151 A | * | 10/2009 |
| JP | 2010-089102 A | | 4/2010 |
| JP | 2010-137274 A | | 6/2010 |
| JP | 2010201447 | | 9/2010 |
| JP | 2012-020288 A | | 2/2012 |
| JP | 2013039613 | | 2/2013 |
| JP | 2013049072 | | 3/2013 |

OTHER PUBLICATIONS

Communication pursuant to Article 94(3) for EP Application No. 15151911.3 dated Jan. 21, 2016 (4 pages).
Extended European Search Report for EP Application No. 15151911.3 dated Jul. 15, 2015 (5 pages).
Japanese Office Action for JP Application No. 2014-107666 dated Aug. 25, 2015 (6 pages).
Office Action for Korean Patent Application No. 10-2016-7008839, dated Apr. 13, 2017.
Office Action for European Patent Application No. 15151911.3, dated Sep. 28, 2017.
Office Action for Chinese Patent Application No. 201480057468.2 dated Aug. 7, 2017.
Search Report for European Patent Application No. 17179459.7, dated Oct. 20, 2017.
Office Action for Korean Patent Application No. 10-2016-7008839, dated Oct. 30, 2017.

* cited by examiner

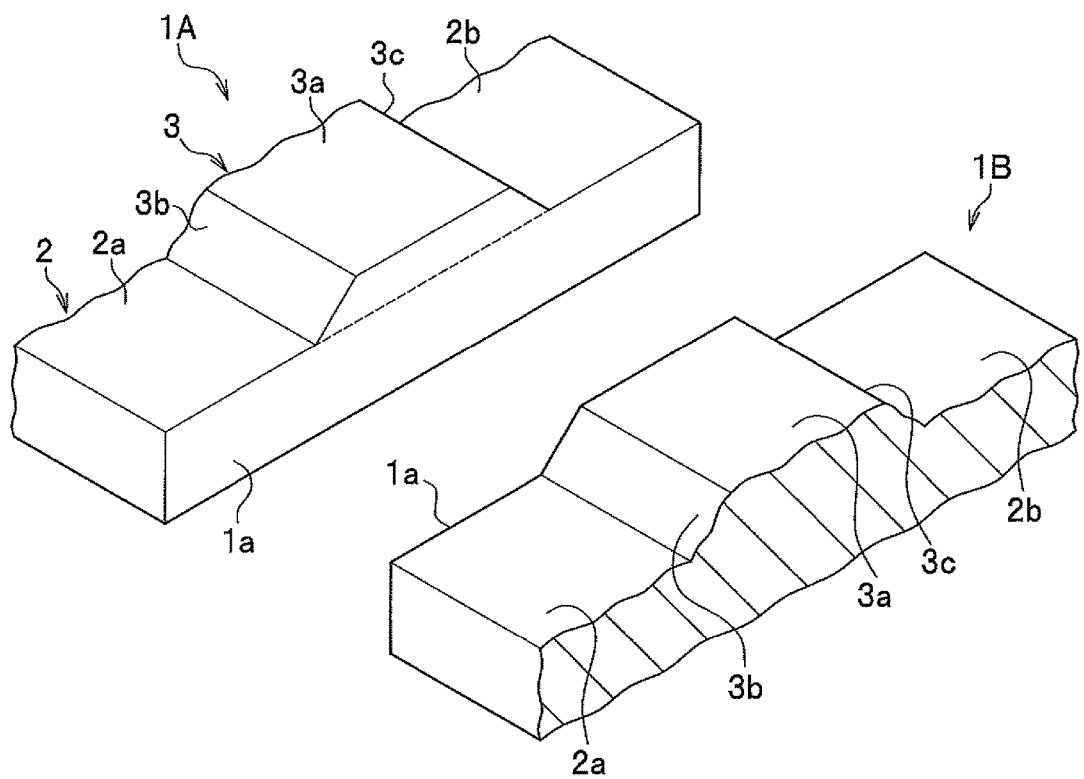
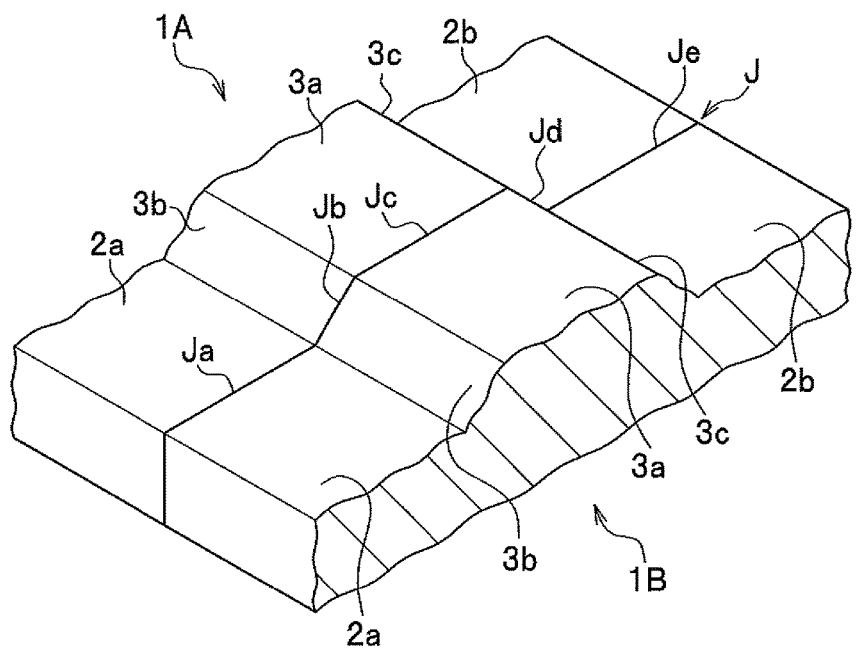

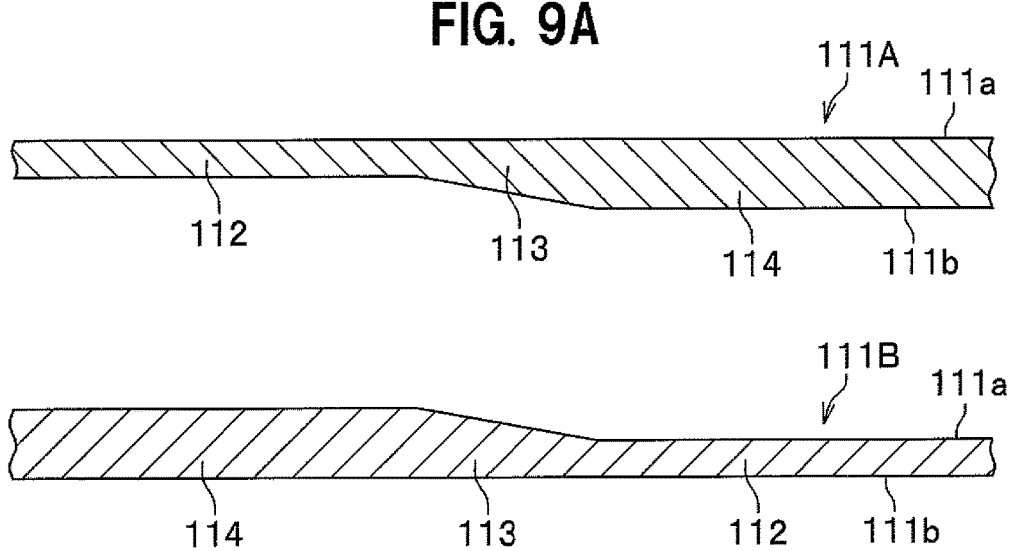
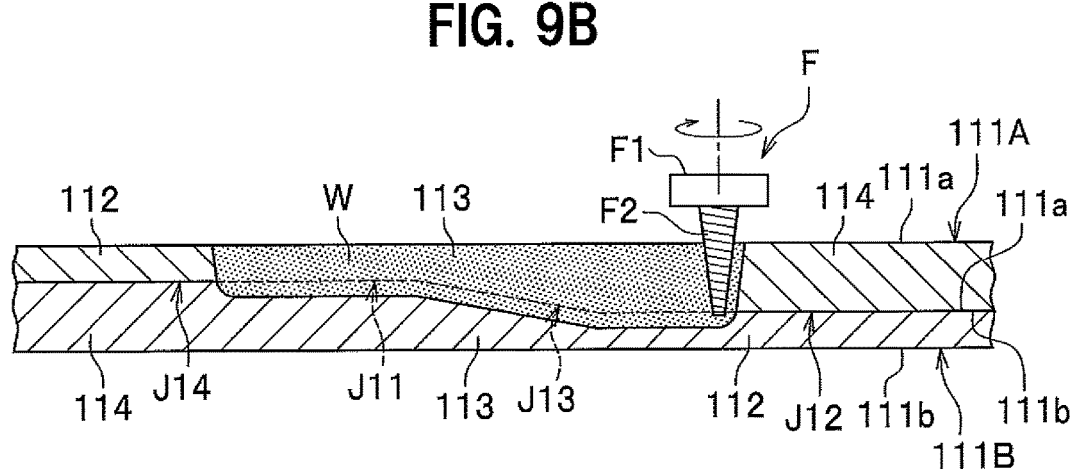

JOINING METHOD

CROSS-REFERENCE TO RELATED APPLICATIONS

This application is based upon and claims the benefit of priority from Japanese Patent Applications No. 2014-012551 filed on Jan. 27, 2014, No. 2014-075625 filed on Apr. 1, 2014 and No. 2014-107666 filed on May 26, 2014; the entire contents of which are incorporated herein by reference.

BACKGROUND OF THE INVENTION

The invention relates to a joining method for welding metal members together by a friction stirring.

There is known a friction stir welding (FSW) for joining metal members together. The friction stir welding is a method in which a rotation tool is rotatingly traversed along the butt portion between metal members, to plastically fluidize a metal or metals along the butt portion with the frictional heat produced between the rotation tool and the metal members, thereby solid-phase joining the metal members together.

For example, Patent Document 1 (Japanese Patent Application Laid-open No. 2008-290092) discloses a technique that the friction stir welding is applied to the butt portion between metal members by use of a rotation tool including a shoulder section and a stirring pin protruding from the lower end surface of the shoulder section.

For example, Patent Document 2 (Japanese Patent Application Laid-open No. 2002-79383) discloses a technique that plate-shaped metal members are stacked on each other before a rotation tool is inserted from the surface of an upper-side metal member to apply a friction stirring to the lap portion.

In each friction stir welding according to the Patent documents 1 and 2, the friction stirring is performed by pushing the lower end surface of the shoulder section of the rotation tool into the surface of the metal member by a few millimeters.

When metal members each including an inclined surface or a curved surface are butted against each other, the resulting butt portion has various heights. When plate-shaped metal members each including an inclined surface or a curved surface are stacked on each other, the resulting lap portion has various heights. In these cases, if a conventional rotation tool is used to perform a friction stir welding, the shoulder section of the rotation tool contacts with the inclined surface or the like, which makes it difficult for the rotation tool to travel. Further, when the friction stir welding is applied to the butt portion or the lap portion with the inclined surface or the like, it is difficult for a stirring pin to be inserted into the butt portion or the lap portion at a deep position, thereby occasionally causing a joint defect.

On the other hand, there is another case in which the friction stir welding is applied to a lap portion which is formed by stacking a first metal member having a front surface with various heights on a second metal member with a constant plate thickness, with the first metal member's back surface in contact with the second metal member's front surface, and the friction stir welding is applied to the lap portion thus formed. In this case also, traveling of the rotation tool is obstructed by the changes in height of the front surface of the first metal member, a surface on the side from which the rotation tool is inserted, which causes a joint defect in the conventional rotation tool.

SUMMARY OF THE INVENTION

The invention is directed to a joining method which enhances operability of a rotation tool and secures joining of metal members even if the height of a butt portion or a lap portion varies.

The invention is directed to a joining method which enhances operability of a rotation tool and secures joining of metal members even if one of the metal members has a surface that varies in height, on the side from which the rotation tool is inserted.

A first aspect of the invention provides a joining method including: a butting process configured to butt a first metal member and a second metal member each having a front surface with various heights against each other to form therebetween a butt portion with various heights; and a welding process configured to apply a friction stirring to the butt portion by a stirring pin of a rotation tool while only the stirring pin of the rotation tool contacts with the first metal member and the second metal member of the butt portion.

In a conventional rotation tool, the shoulder section contacts with metal members during friction stirring. On the other hand, according to the joining method of the invention, there are not any cases in which a shoulder section of a rotation tool contacts with metal members. Therefore, while the stirring pin is inserted in the butt portion at a sufficient depth, a relative height position of the rotation tool is easily adjusted in accordance with the variation of the height of the butt portion. Further, the stirring pin is easily inserted at a deep position in the butt portion even if the butt portion has various heights, thereby securely joining the metal members together along the butt portion. In addition, while only the stirring pin contacts with the first and second metal members, the friction stirring is performed, which reduces a load exerted on the friction stir apparatus. Therefore, without exerting a large load on the friction stir apparatus, the butt portion is friction stirred at a deep position.

The welding process may be configured to insert the stirring pin of the rotation tool into the butt portion from front surfaces of the first metal member and the second metal member and apply the friction stirring to the butt portion while an insertion depth of the stirring pin is kept approximately constant. The welding process may be configured to insert the stirring pin of the rotation tool into the butt portion from front surfaces of the first metal member and the second metal member and apply the friction stirring to the butt portion while an insertion depth of the stirring pin is adjusted such that a depth of a plasticized region produced by the friction stirring is approximately constant.

According to the joining methods, a joining strength for each joint portion is kept approximately constant.

A second aspect of the invention provides a joining method including: a stacking process configured to stack a first metal member on a second metal member, with a back surface of the first metal member in contact with a front surface of the second metal member, to form a lap portion therebetween, the first metal member having various heights at least at the back surface thereof, the second metal member having various heights at least at the front surface thereof; and a welding process configured to insert a stirring pin of a rotation tool into the first metal member from a front surface of the first metal member toward the lap portion and apply a friction stirring to the lap portion by the stirring pin of the rotation tool while only the stirring pin of the rotation tool contacts with both the first metal member and the second metal member of the lap portion or the first metal member of the lap portion.

In a conventional rotation tool, the shoulder section contacts with a metal member during friction stirring. On the other hand, according to the joining method of the invention, there are not any cases in which a shoulder section of a rotation tool contacts with a metal member. Therefore, while the stirring pin is inserted at a sufficient depth, a relative height position of the rotation tool is easily adjusted in accordance with the variation of the height of the lap portion. The stirring pin is inserted to the lap portion disposed at a deep position, thereby securely joining the metal members together at their surfaces on the lap portion. In addition, the friction stirring is performed with only the stirring pin disposed in contact with both the first metal member and the second metal member or the first metal member, which reduces a load exerted on the friction stir apparatus. Thereby, without exerting a large load on the friction stir apparatus, the lap portion disposed at a deep position is frictionally stirred.

The welding process may be configured to apply the friction stirring to the lap portion while an insertion depth of the stirring pin is kept approximately constant.

The welding process may be configured to adjust an insertion depth of the stirring pin such that a depth of a plasticized region produced by the friction stirring is approximately constant.

According to the joining methods, a joining strength for each joint portion is kept approximately constant.

A third aspect of the invention provides a joining method including: a stacking process configured to stack a first metal member including a front surface with various heights on a second metal member with a back surface of the first metal member in contact with a front surface of the second metal member to form a lap portion therebetween; and a welding process configured to insert a stirring pin of a rotation tool into the first metal member from the front surface of the first metal member toward the lap portion and apply a friction stirring to the lap portion by the stirring pin of the rotation tool while only the stirring pin of the rotation tool contacts with both the first metal member and the second metal member of the lap portion or the first metal member of the lap portion.

In a conventional rotation tool, the shoulder section contacts with a metal member during friction stirring. On the other hand, according to the joining method of the invention, there are not any cases in which a shoulder section of a rotation tool contacts with a metal member. Therefore, even if the first metal member has a front surface with various heights, the stirring pin is easily inserted to the lap portion disposed at a deep position. This makes it possible to securely join the metal members together at their surfaces on the lap portion. In addition, the friction stirring is performed with only the stirring pin disposed in contact with the metal member, which reduces a load exerted on the friction stir apparatus. Thereby, without exerting a large load on the friction stir apparatus, the lap portion disposed at a deep position is friction stirred.

The stirring pin includes a circumferential surface having a spiral groove cut therein.

The spiral groove extends counterclockwise from a proximal end side to a distal end side of the stirring pin, and the rotation tool rotates clockwise. The spiral groove extends clockwise from the proximal end side to the distal end side of the stirring pin, and the rotation tool rotates counterclockwise.

According to the joining method, the metal member plastically fluidized is guided along the spiral groove to travel to the distal end side of the stirring pin, thereby reducing an amount of metal which overflows to the outside of the metal member.

According to the joining methods of the inventions, if the height of the butt portion or the lap portion varies, operability of the rotation tool is enhanced and a joint is secured. In addition, even if the first metal member for inserting the rotation tool includes a front surface with various heights, operability of the rotation tool is enhanced and a joint is secured.

BRIEF DESCRIPTION OF THE ACCOMPANYING DRAWINGS

FIG. 2A is a perspective view of metal members for a joining method according to a first embodiment of the invention;

FIG. 2B is a perspective view illustrating a butting process of the joining method according to the first embodiment;

FIG. 3A is a perspective view, and FIG. 3B is a sectional view taken along IIIB-IIIB in FIG. 3A;

FIG. 9A is a longitudinal sectional view illustrating metal members according to a third modification of the second embodiment;

FIG. 9B is a longitudinal sectional view illustrating a joining method according to the third modification of the second embodiment;

DETAILED DESCRIPTION OF THE PREFERRED EMBODIMENTS

First Embodiment

The embodiment of the invention will be described in detail with reference to the drawings. Firstly, the description will be given of a rotation tool for welding (referred to as a welding rotation tool).

Figure 1A:
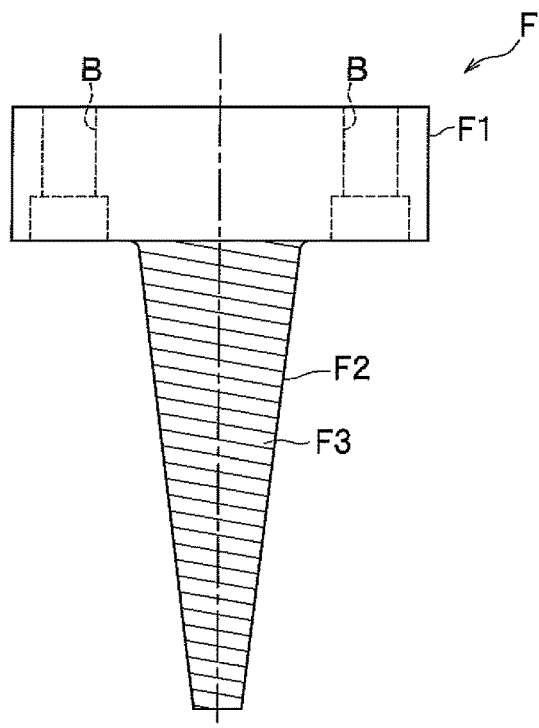
FIG. 1A is an elevation view illustrating a welding rotation tool of the embodiments.
Figure 1B:
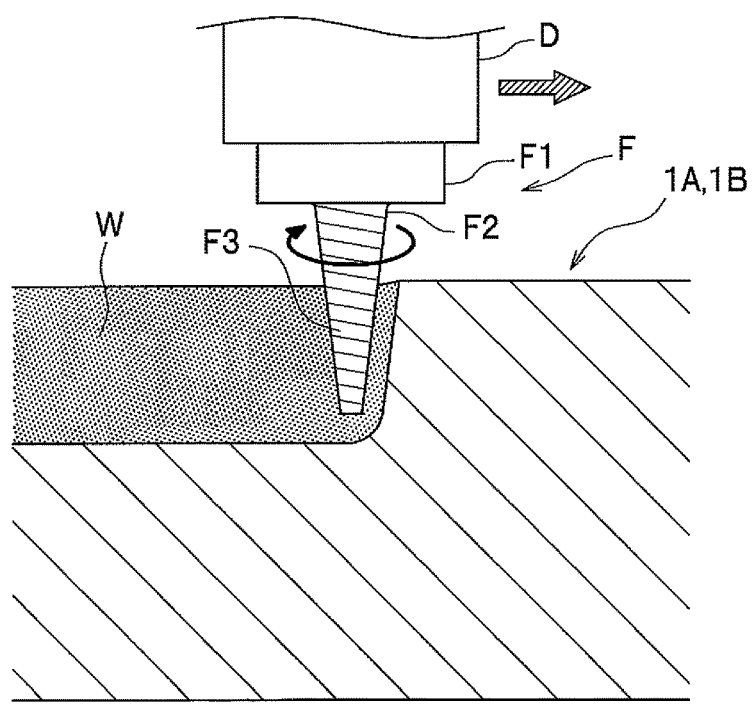
FIG. 1B is a schematic sectional view illustrating a welding condition using the welding rotation tool.

As shown in FIG. 1A, a welding rotation tool F is composed of a connection section F1 and a stirring pin or probe F2. The welding rotation tool F corresponds to "a rotation tool" in the Claims. The welding rotation tool F is made of, for example, a tool steel. The connection section F1 is a portion that connects with a rotation axis D of a friction stir apparatus as illustrated in FIG. 1B. The connection section F1 in a cylindrical shape is formed with screw holes B in which bolts are fastened, respectively.

The stirring pin F2 extends downward from the connection section F1 and is coaxial with the connection section F1. The stirring pin F2 tapers down from the proximal end to the distal end thereof as extending from the connection section F1. The stirring pin F2 has an outer circumferential surface having a spiral groove F3 cut thereinto. In the embodiment, in order to rotate clockwise the welding rotation tool F, the spiral groove F3 extends counterclockwise from the proximal end to the distal end. In other words, the spiral groove F3 extends counterclockwise as viewed from the top when being traced from the proximal end to the distal end.

It is noted that if the welding rotation tool F rotates counterclockwise, the spiral groove F3 may extend preferably clockwise from the proximal end to the distal end. In other words, this spiral groove F3 extends clockwise as viewed from the top when being traced from the proximal end to the distal end. Such a set spiral groove F3 guides a metal plastically fluidized during friction stirring to the distal end of the stirring pin F2. This guide reduces an amount of a metal which overflows to the outside of the metal members to be joined (or first and second metal members 1A and 1B).

As illustrated in FIG. 1B, when the welding rotation tool F is used to perform friction stir welding, only the rotating stirring pin F2 is inserted into the metal members 1A and 1B to be joined, and the welding rotation tool F travels while the respective metal members 1A and 1B to be joined and the connection section F1 are kept apart from each other. In other words, the friction stir welding is performed with the proximal end of the stirring pin F2 disposed outside the metal members to be joined. On the traveling locus of the welding rotation tool F, the friction stirred metal is hardened and a plasticized region W is formed.

Next, the description will be given of the joining method according to the first embodiment. As illustrated in FIGS. 2A and 2B, the end surfaces 1a of the metal members 1A and 1B are butted against each other to form a butt portion J therebetween, along which friction stirring is performed to join the metal members. The metal members 1A and 1B are metal members, respectively, and the portions to be butted are identical in shape with each other. The metal members 1A and 1B are made of equivalent materials. The materials of the metal members 1A and 1B are not specifically limited if they are friction stirrable metals. For example, each material may be appropriately selected from aluminum, aluminum alloy, copper, copper alloy, titanium, titanium alloy, magnesium, magnesium alloy and the like.

As illustrated in FIG. 2A, each of the metal member 1A and 1B is composed of a primary section 2 of a rectangular parallelepiped, and a projection section 3 of a trapezoid section formed on the primary section 2. The projection section 3 has a front surface 3a positioned above the front surfaces 2a and 2b of the primary section 2. The projection section 3 has a first front surface 3b which inclines to the front surface 3a and connects the surface 2a of the primary section 2 and the front surface 3a of the primary section 3. The projection section 3 has a second front surface 3c which inclines to the front surface 3a and connects the front surface 2b of the primary section 2 and the front surface 3a of the projection section 3.

In the joining method according to the embodiment, a butting process and a welding process are performed. As illustrated in FIG. 2A, the butting process serves as a process for butting the end surfaces 1a and 1a of the metal members 1A and 1B against each other. In the butting process, the metal members 1A and 1B are butted against each other such that a respective front surface of the metal member 1A and a corresponding front surface of the metal member 1B are flush with each other.

As illustrated in FIG. 2B, in the butting process, the end surfaces 1a and 1a of the metal members 1A and 1B are brought in face-to-face contact with each other, forming a butt portion J. The butt portion J is formed with various height positions. That is, if a height (elevation) of the butt portion J at a start point (insertion position) for the friction stirring is set to be a reference height, the butt section J has sections with various heights, among which are ones whose heights are different from the reference height, from the start point to the end point. The butt portion J of the embodiment includes a first flat section Ja, a first inclined section Jb, a second flat section Jc, a second inclined section Jd, and a third flat section Je.

Figure 3A:
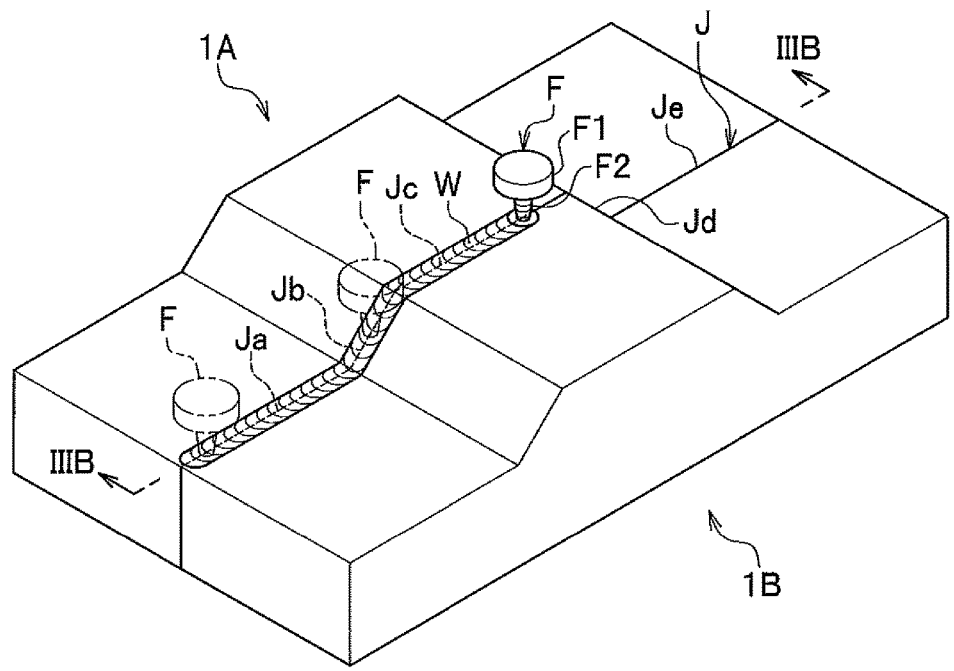
FIGS. 3A and 3B are views illustrating a welding process of the joining method according to the first embodiment.

As illustrated in FIG. 3A, the welding process serves as a process for applying a friction stir welding to the butt portion J by use of the welding rotation tool F. In the welding process, the stirring pin F2 of the rotating welding rotation tool F is inserted into the end portion of the first flat section Ja of the butt portion J, and the welding rotation tool F travels relatively along the butt portion J. In this embodiment, the welding rotation tool F performs the friction stirring with the rotation central axis always disposed in parallel with the vertical axis. Portions of the metal members 1A and 1B around the stirring pin F2 are friction stirred by the welding process, and thereby the metal members 1A and 1B are welded together. On the traveling locus of the welding rotation tool F, a plasticized region W is formed.

Figure 3B:
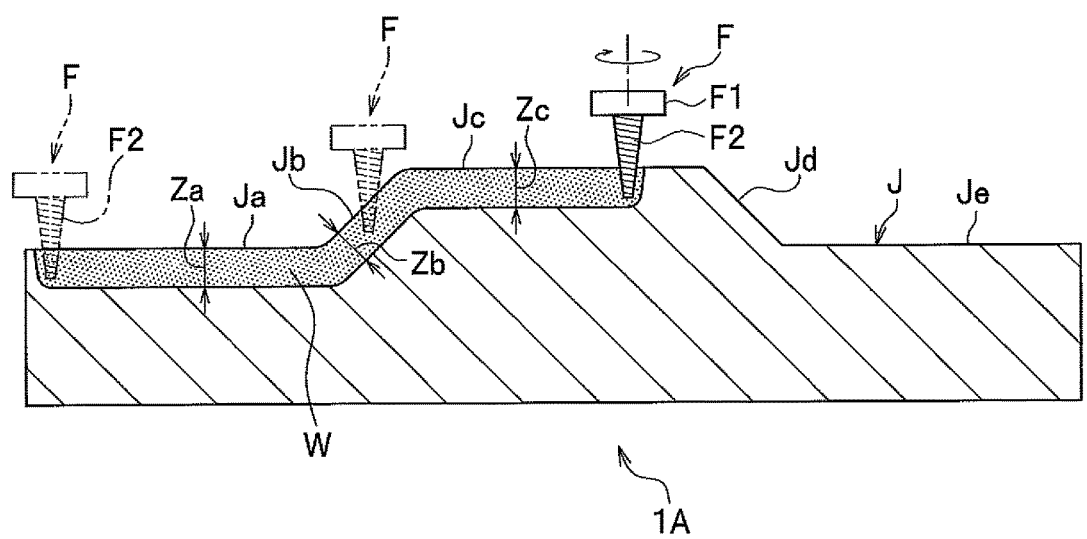

As illustrated in FIG. 3B, in the welding process according to the embodiment, a friction stirring is applied to the butt portion J with only the stirring pin F2 disposed in contact with the metal members 1A and 1B while the insertion depth of the stirring pin F2 along the butt portion J is kept approximately constant. In the welding process according to the embodiment, the friction stirring is performed by vertically moving the welding rotation tool F relative to a base (illustration omitted) on which the metal members 1A and 1B are fixed.

This makes it possible for the depth Za of the plasticized region W of the first flat section Ja, the depth Zb of the plasticized region W of the first inclined section Jb (the depth of the plasticized region W on the line orthogonal to the first surface 3b), and the depth Zc of the plasticized region W of the second flat section Jc to be approximately equal to each other. "Insertion depth" of the stirring pin F2 means a distance from the front surfaces of the metal members 1A and 1B to the distal end of the stirring pin F2 on the rotation central axis of the welding rotation tool F.

It is noted that though in the welding process according to the embodiment, the welding rotation tool F is vertically moved relative to the base (illustration omitted), a friction stirring may be performed by vertically moving the base while the welding rotation tool F is being fixed at a height position.

According to the above-described joining method of the embodiment, there is not any case in which a shoulder section would contact with metal members. Thereby, while the stirring pin F2 is inserted at a sufficient depth in the butt portion J, a relative height position of the welding rotation tool F is easily adjusted in accordance with the variation of the height of the butt portion J. Even if the height of the butt portion J varies, the stirring pin F2 is easily inserted into a deep portion of the butt portion J, thereby securely welding the metal members 1A and 1B together along the butt portion J. That is, even if the butt portion J between the metal members 1A and 1B has an upward inclination (upward gradient) or a downward inclination (downward gradient), operability of the welding rotation tool F is enhanced.

The depth of the plasticized region W is kept constant, and the joining strength of the joint portion is kept constant even if the height of the butt portion J varies.

In addition, the friction stirring is performed with only the stirring pin F2 disposed in contact with the metal members 1A and 1B, which reduces a load exerted on the friction stir apparatus. This makes it possible to friction stir the deep portion of the butt portion J without exerting a large load on the friction stir apparatus.

It is noted that at the height change point of the butt portion J and the inclined surface (first inclined section Jb or second inclined section Jd), it is occasionally difficult for a depth of the plasticized region W to be constant even if the insertion depth of the stirring pin F2 is rendered constant. In such a case, the insertion depth of the stirring pin F2 of the welding rotation tool F at the butt portion J may be appropriately adjusted such that the depth of the plasticized region W is approximately constant.

First Modification

Figure 4A:
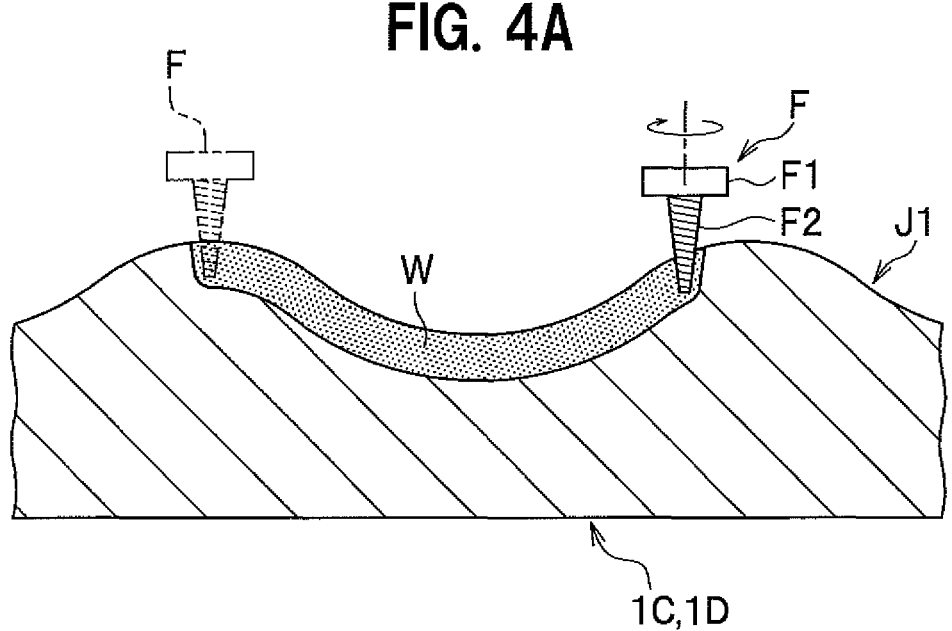
FIG. 4A is a longitudinal sectional view illustrating a joining method according to a first modification of the first embodiment.
Figure 4B:
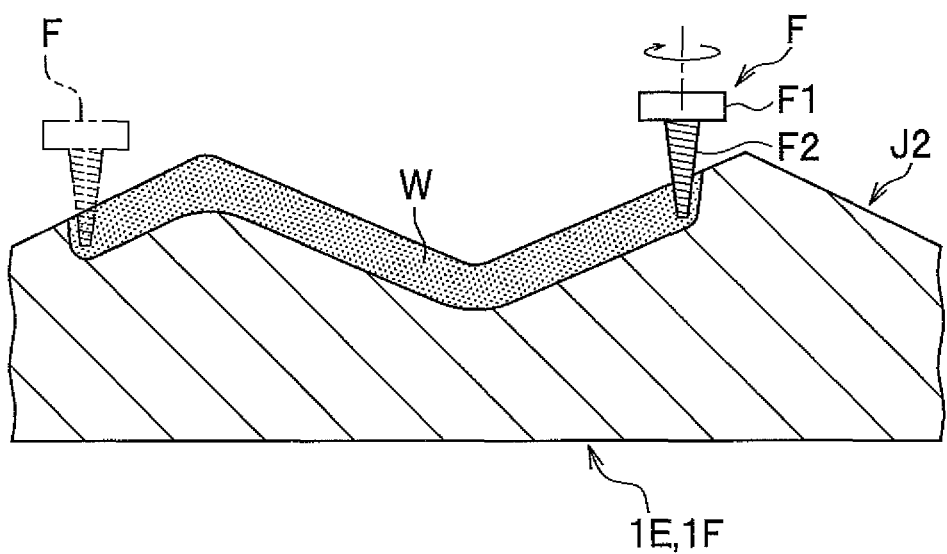
FIG. 4B is a longitudinal sectional view illustrating a joining method according to a second modification of the first embodiment.

Next, the description will be given of modifications of the present embodiment. FIG. 4A is a longitudinal sectional view of a butt portion in a joining method according to a first modification of the first embodiment. FIG. 4B is a longitudinal sectional view of a butt portion in a joining method according to a second modification of the first embodiment. The first modification as illustrated in FIG. 4A differs from the above-described embodiment in that the height of the butt portion 51 varies and the front surfaces of metal members 1C and 1D serve as curved surfaces, respectively.

The welding process of the first modification serves as a process for applying the friction stir welding to the butt portion 51 by use of the welding rotation tool F. In the welding process according to the first modification, the friction stirring is performed with only the stirring pin F2 disposed in contact with the metal members 1C and 1D while the insertion depth of the stirring pin F2 from the front surfaces of the metal members 1C and 1D at the butt portion 51 is kept approximately constant. The connection section F1 of the welding rotation tool F is apart from the front surfaces of the metal members 1C and 1D during the friction stirring.

Second Modification

The second modification as illustrated in FIG. 4B differs from the above-described embodiment in that the upward inclination (upward gradient) and the downward inclination (downward gradient) are alternately contiguous with each other.

The welding process of the second modification serves as a process for applying a friction stirring welding to a butt portion J2 by use of the welding rotation tool F. In the welding process of the second modification, the friction stirring is performed with only the stirring pin F2 disposed in contact with the metal members 1E and 1F while the insertion depth of the stirring pin F2 from the front surfaces at the butt portion J2 is kept approximately constant. The connection section F1 of the welding rotation tool F is apart from the front surfaces of the metal members 1E and 1F during the friction stirring.

In such joining methods according to the first modification and the second modification, the surfaces of metal members 1C and 1D serve as curved surfaces and the upward inclination and the downward inclination of the metal members 1E and 1F are sequentially contiguous to each other. These cases also serve advantageous effects as approximately the same as those of the above-described first embodiment.

Third Modification

Figure 5:
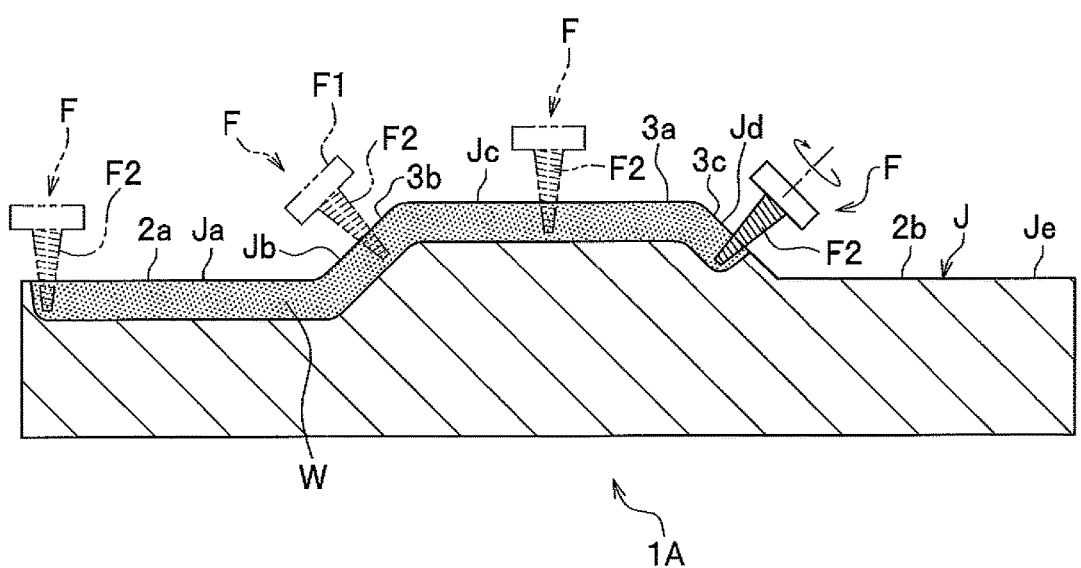
FIG. 5 is a longitudinal sectional view illustrating a joining method according to a third modification of the first embodiment.

FIG. 5 is a longitudinal sectional view illustrating a joining method according to a third modification of the first embodiment. The third modification differs from the first embodiment in that the friction stirring is applied to joint surfaces with the welding rotation tool F disposed perpendicularly to the joint surfaces.

As illustrated in FIG. 5, when the welding process of the third modification is performed, a friction stirring is performed while the welding rotation tool F is inserted in the joint surfaces perpendicularly thereto. In the welding process of the third modification, the friction stirring is applied to the first flat section Ja, the second flat section Jc and the third flat section Je with the rotation central axis of the welding rotation tool F disposed in parallel with the vertical axis. On the other hand, the friction stirring is applied to the first inclined section Jb and the second inclined section Jd by inclining the welding rotation tool F to the vertical axis with the rotation central axis of the welding rotation tool F disposed perpendicularly to the joint surfaces (first surface 3b and second surface 3c) of the first inclined section Jb and the second inclined section Jd.

In the case of performing the third modification, the friction stirring may be performed with the welding rotation tool F fitted to a robot arm having an end provided with a rotation driving unit such as a spindle unit. Such a friction stir apparatus facilitates changing an angle of the rotation central axis of the welding rotation tool F relative to the vertical axis. Therefore, even if the height of the butt portion J varies, an angle of the rotation central axis of the welding rotation tool F is changed relative to the vertical axis during the friction stirring. This makes it possible to perform a continuous friction stirring with the welding rotation tool F always disposed perpendicularly to the joint surfaces.

The third modification also serves advantageous effects as approximately the same as those of the first embodiment. The welding rotation tool F is inserted into each joint surface perpendicularly thereto, which makes it possible to apply the friction stirring to the deep portion of the butt portion J even if a joint surface is an inclined surface. If a joint surface is a curved surface, the friction stirring may be performed with the rotation central axis of the welding rotation tool F disposed in parallel to the normal line of the joint surface.

The above-description is given of the embodiment of the invention and the modifications, and, in addition, the appropriate design modifications are possible within the scope of the invention. For example, before the welding process is performed, a small-sized rotation tool F may be used for performing the friction stirring or a welding may be used for performing a temporary welding process. This prevents the butt portion from opening during the welding process.

When the welding process is performed, tab members may be disposed at both the ends of the butt portion. Each tab member has a surface to which the start position and the end position may be set. After the welding process finishes, the tab members may be cut off. This setting enhances operability of the welding process. The setting makes it possible to finely finish the side surfaces of the metal members 1A and 1B.

Second Embodiment

Figure 6:
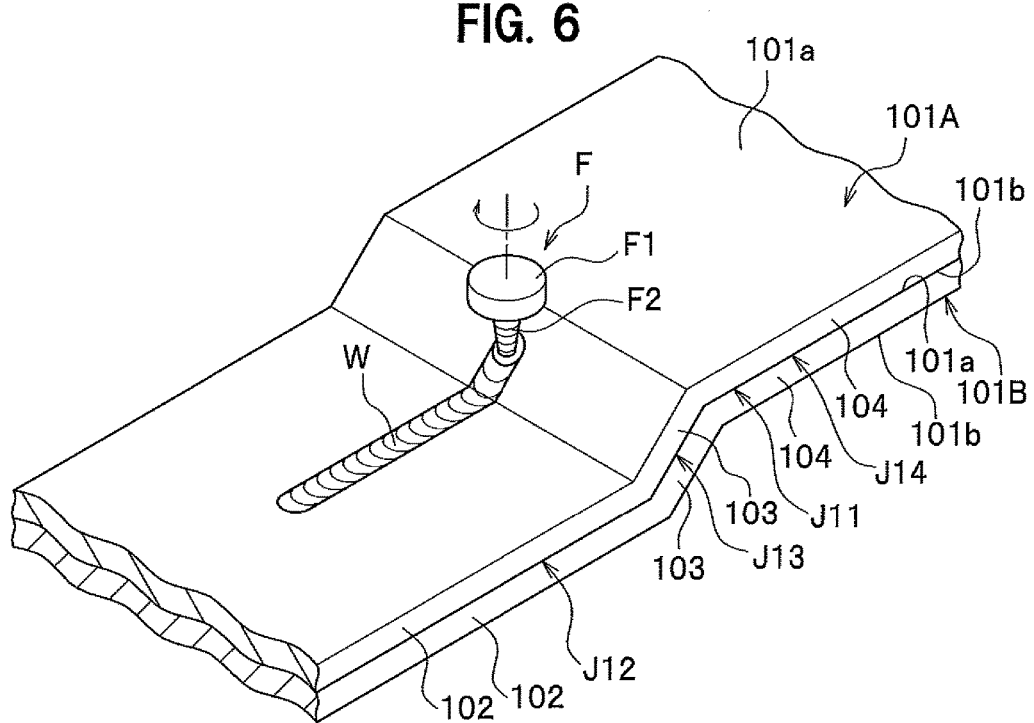
FIG. 6 is a perspective view illustrating a joining method according to a second embodiment of the invention.

Next, the description will be given of a joining method according to the second embodiment of the invention. As illustrated in FIG. 6, in this embodiment, metal members 101A and 101B are stacked on each other, forming a lap portion J11 therebetween. The metal members 101A and 101B are welded together at their surfaces on the lap portion by use of the friction stirring. The metal members 101A and 101B are metal plate members, respectively, and identical in shape with each other.

The metal members 101A and 101B are made of equivalent materials. If each material of the metal members 101A and 101B is a friction stirrable metal, each material is not particularly limited. The material may be appropriately selected from, for example, aluminum, aluminum alloy, copper, copper alloy, titanium, titanium alloy, magnesium, magnesium alloy and the like.

As illustrated in FIG. 6, metal members 101A and 101B are composed of first flat sections 102, inclined sections 103, and second flat sections 104, respectively. The first flat sections 102, the inclined sections 103 and the second flat sections 104 have constant thicknesses and plate shapes, respectively. The second flat sections 104 are formed at higher positions than those of the first flat sections 102, respectively. The inclined sections 103 connect end sides of the first flat section 102 and opposite end sides of the second flat sections 104, respectively.

The metal members 101A and 101B of the embodiment have constant thicknesses and both the front surfaces 101a and the back surfaces 101b thereof each are formed with various heights. On the other hand, the metal members 101A and 101B of the embodiment are not limited to this if: the metal member 101B disposed on the lower side has various heights at least at the front surface 101a thereof; and the metal member 101A disposed on the upper side has various heights at at least the back surface 101b thereof; and said at least front surface 101a and back surface 101b are in face-to-face contact with each other.

In the joining method according to the embodiment, a stacking process and a welding process are performed. As illustrated in FIG. 6, the stacking process serves as a process for stacking the upper metal member 101A on the lower metal member 101B with the former's back surface 101b disposed on the latter's front surface 101a. In the embodiment, the front surface 101a of the lower metal member 101B and the back surface 101b of the upper metal member 101A are identical in shape with each other. In the stacking process, the front surface 101a of the lower metal member 101B and the back surface 101b of the upper metal member 101A are disposed in face-to-face contact with each other, thereby forming a lap portion J11.

The lap portion J11 (boundary surface between the metal members 101A and 101B) is formed with various height positions. That is, if a height (elevation) of the lap portion J11 at the start point (insertion position) for the friction stirring is set to be a reference height, the lap portion J11 has sections with various heights, among which are ones whose heights are different from the reference height, from the start point to the end point. In the embodiment, the lap portion J11 is composed of a first flat lap portion J12, an inclined lap portion J13, and a second flat lap portion J14. The upper metal member 101A of this embodiment has a constant thickness, and heights of the lap portion J11 and the surface 101a of the upper metal member 101A vary together.

Figure 7:
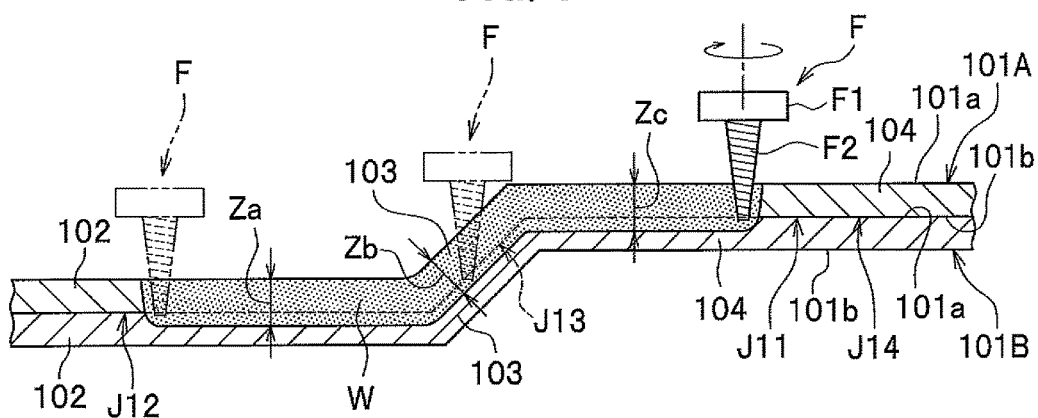
FIG. 7 is a longitudinal sectional view illustrating the joining method according to the second embodiment.

As illustrated in FIG. 7, the welding process serves as a process for applying the friction stir welding to the lap portion J11 by use of the welding rotation tool F. In the welding process, the stirring pin F2 of the welding rotation tool F rotating clockwise is inserted from the surface 101a of the upper metal member 101A, and the welding rotation tool F is moved relatively on the surface 101a of the upper metal member 101A. The metal around the lap portion J11 is friction stirred by the welding process, thereby welding the metal members 101A and 101B together. On the traveling locus of the welding rotation tool F, a plasticized region W is formed. In the welding process, the friction stirring is performed with the rotation center axis of the welding rotation tool F always disposed in parallel with the vertical axis.

The insertion depth of the stirring pin F2 may be set such that the plasticized region W formed by the friction stirring extends at least to the lap portion J11. On the other hand, in this embodiment, the distal end of the stirring pin F2 is set such that it contacts with the lower metal member 101B.

As illustrated in FIG. 7, in the welding process according to the embodiment, a friction stirring is performed with only the stirring pin F2 disposed in contact with the metal members 101A and 101B while the depth of insertion of the stirring pin F2 toward the lap portion J11 is kept approximately constant. The connection section F1 of the welding rotation tool F is apart from the front surface 101a of the upper metal member 101A during the friction stirring. In the welding process of this embodiment, the friction stirring is performed by moving the welding rotation tool F vertically relative to the base (illustration omitted) on which the metal members 101A and 101B fixed.

This friction stirring makes it possible for the depth Za of the plasticized region W of the first flat lap portion J12, the depth Zb of the plasticized region W of the inclined lap portion J13 (the depth of the plasticized region W on the line orthogonal to the inclined section 103) and the depth Zc of the plasticized region W of the second flat lap portion J14 to be approximately equal to each other. "Insertion depth" of the stirring pin F2 means a distance from the surface 101a of the metal member 101A to the distal end of the stirring pin F2 on the rotation central axis of the welding rotation tool F.

It is noted that though in the welding process according to the embodiment, the welding rotation tool F is moved vertically relative to the base (illustration omitted), the friction stirring may be performed by vertically moving the base while the welding rotation tool F is being fixed at a height position.

According to the above-described joining method of the embodiment, there are not any cases in which a shoulder portion would contact with a metal member. Therefore, while the stirring pin F2 is inserted at a sufficient depth, a relative height position of the welding rotation tool F is easily adjusted in accordance with the variation of the height of the lap portion J11. Even if the height of the lap portion J11 varies, the stirring pin F2 is easily inserted to the lap portion J11 disposed at a deep position, thereby securely welding the metal members together at their surfaces on the lap portion J11. That is, even if the lap portion J11 of the metal members 101A and 101B has an upward inclination (upward gradient) or a downward inclination (downward gradient), the operability of the welding rotation tool F is enhanced.

The depth of the plasticized region W is made constant, which makes it possible for the joining strength of the joint portion to be kept constant even if the height of the lap portion J11 varies.

In addition, the friction stirring is performed with only the stirring pin F2 disposed in contact with the metal members 101A and 101B, thereby reducing a load exerted on the friction stir apparatus. This reduction makes it possible to apply the friction stirring to the lap portion J11 disposed at a deep position without exerting a large load on the friction stir apparatus.

In the welding process, the friction stirring is performed by bringing the distal end of the stirring pin F2 in contact with (or into) the lower metal member 101B, thereby securely welding the metal members 101A and 101B together at their surfaces on the lap portion J11.

It is noted that at the height change point and the inclined surface (inclined lap portion J13) of the lap portion J11, it is occasionally difficult for the depth of the plasticized region W to be constant even if the insertion depth of the stirring pin F2 is rendered constant. In such a case, the insertion depth of inserting the stirring pin F2 of the welding rotation tool F toward the lap portion J11 may be appropriately adjusted.

First Modification

Figure 8A:
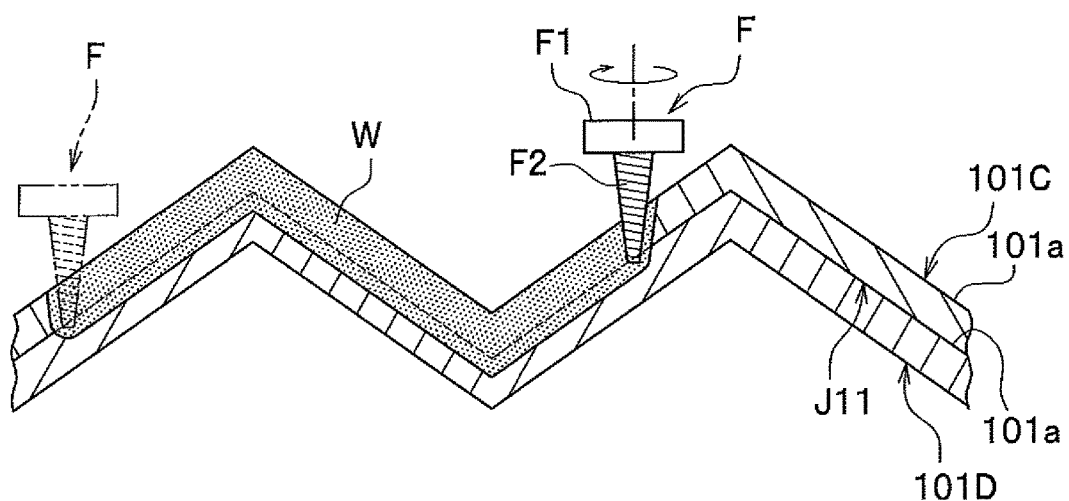
FIG. 8A is a longitudinal sectional view illustrating a joining method according to a first modification of the second embodiment.
Figure 8B:
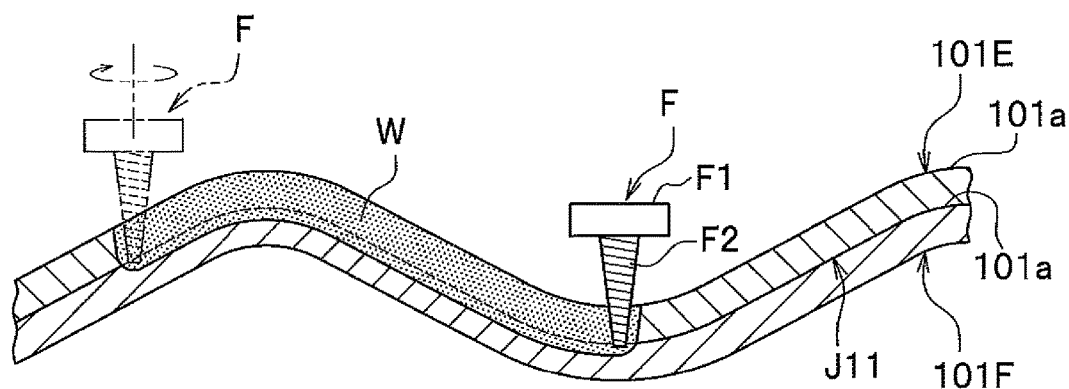
FIG. 8B is a longitudinal sectional view illustrating a joining method according to a second modification of the second embodiment.

The following description will be given of the modification of the embodiment. FIG. 8A is a longitudinal sectional view illustrating a joining method according to a first modification of the second embodiment. FIG. 8B is a longitudinal sectional view illustrating a joining method according to a second modification of the second embodiment. The first modification as illustrated in FIG. 8A differs from the above-described embodiment in that the upward inclination (upward gradient) and the downward inclination (downward gradient) of the lap portion J11 are alternately contiguous with each other.

The welding process of the first modification serves as a process for applying a friction stir welding to the lap portion J11 by use of the welding rotation tool F. In the welding process of the first modification, while the depth of the stirring pin F2 toward the lap portion J11 is kept approximately constant, the friction stirring is performed with only the stirring pin F2 disposed in contact with the metal members 101C and 101D. The connection section F1 of the welding rotation tool F is apart from the front surface 101a of the upper metal member 101C during the friction stirring.

Second Modification

The second modification illustrated in FIG. 8B differs from the above-described embodiment in that the height of the lap portion J11 varies and metal members 101E and 101F are curved in a vertical direction.

The welding process of the second modification serves as a process for applying a friction stir welding to the lap portion J11 by use of the welding rotation tool F. In the welding process of the second modification, while the insertion depth of the stirring pin F2 toward the lap portion J11 is kept approximately constant, the friction stirring is performed with only the stirring pin F2 disposed in contact with the metal members 101E and 101F. The connection section F1 of the welding rotation tool F is apart from the front surface 101a of the upper metal member 101E during the friction stirring.

The joining methods according to the first modification and second modification serve advantageous effects as approximately the same as those of the above-described embodiment even if each front surface 101a of the metal member 101C and 101D has an upward inclination and a downward inclination contiguous with each other or each front surface 101a of the metal member 101E and 101F is a curved surface.

Third Modification

The third modification illustrated in FIGS. 9A and 9B differs from the second embodiment in that the front surface 111a of a metal member 111A for inserting the welding rotation tool F is flat, while the height of the lap portion J11 varies.

A lower metal member 111B serves as a plate member formed with different thicknesses. The lower metal member 111B includes a thin wall section 112, a thick wall section 114 thicker than the thin wall section 112, an inclined section 113 extending between the thin wall section 112 and the thick wall section 114. The inclined section 113 has a trapezoidal section. The inclined section 113 has a front surface which is contiguous with the front surfaces of the thin wall section 112 and thick wall section 114. The inclined section 113 is inclined upward from the thin wall section 112 to the thick wall section 114. Thereby, the front surface 111a of the lower metal member 111B is formed with various heights. The back surface 111b of the lower metal member 111B is flat without various heights.

The upper metal member 111A is identical in shape with the lower metal member 111B. The upper metal member 111A is disposed in point symmetry with the lower metal member 111B. Thereby, the front surface 111a of the upper metal member 111A is flat or horizontal without various heights. The height of the back surface 111b of the upper metal member 111A varies.

In the stacking process, the lower metal member 111B and the upper metal member 111A are stacked on each other, with the former's front surface 111a and the latter's back surface 111b in face-to-face contact. As illustrated in FIG. 9B, the stacking process produces a lap portion J11. The lap portion J11 is formed with various height positions. That is, the lap portion J11 is composed of a first flat lap portion J12, an inclined lap portion J13 and a second flat lap portion J14.

As illustrated in FIG. 9B, the welding process serves as a process for applying a friction stir welding to the lap portion J11 by use of the welding rotation tool F. In the welding process, the stirring pin F2 of the welding rotation tool F rotating clockwise is inserted from the front surface 111a of the upper metal member 111A. The welding rotation tool F is moved relatively on the front surface 111a of the upper metal member 111A. In the welding process, the friction stirring is applied to a metal around the lap portion J11, thereby welding the metal members 111A and 111B together. On the traveling locus of the welding rotation tool F, a plasticized region W is formed. In the welding process, the friction stirring is performed with the rotation central axis of the welding rotation tool F disposed in parallel with the vertical axis.

In the welding process according to the third modification, the friction stirring is performed by moving the welding rotation tool F vertically relative to the base (illustration omitted) on which the metal members 111A and 111B are fixed. The insertion depth of the stirring pin F2 may be set such that at least plasticized region W formed by the friction stirring extends at least to the lap portion J11. In this embodiment, the insertion depth of the stirring pin F2 is set such that the distal end of the stirring pin F2 contacts with the lower metal member 111B in accordance with the variation of the height of the lap portion J11.

In the welding process according to the third modification, the welding rotation tool F is moved vertically relative to the base (illustration omitted). On the other hand, the friction stirring may be performed by moving the base vertically relative to the welding rotation tool F while the welding rotation tool F is being fixed at a height position.

In the third modification, the front surface 111a of the upper metal member 111A for inserting the welding rotation tool F is flat, while the height of the lap portion J11 varies. The third modification also serves advantageous effects as approximately the same as those of the second embodiment. Thus, the metal members joined together may be shaped such that at least the front surface of the lower metal member and at least the back surface of the upper metal member make face-to-face contact with each other.

Fourth Modification

Figure 10:
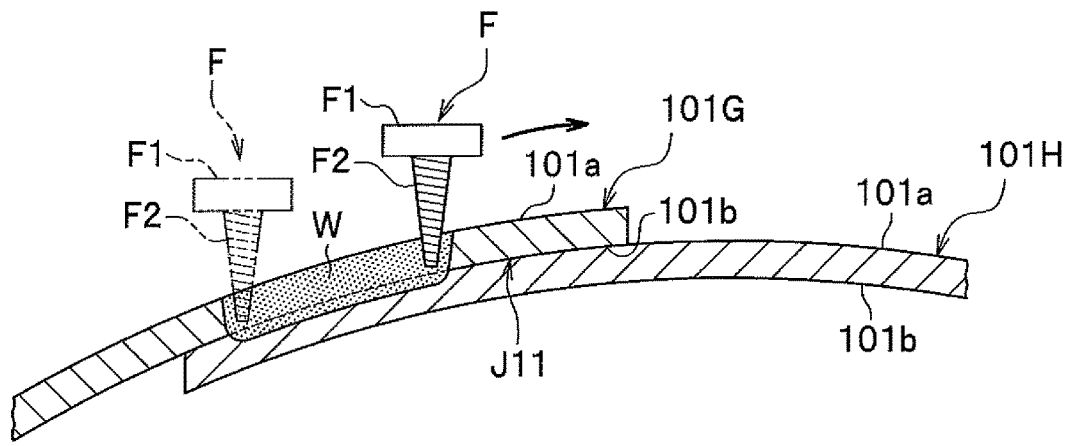
FIG. 10 is a longitudinal sectional view illustrating a joining method according to a fourth modification of the second embodiment.

FIG. 10 is a longitudinal sectional view illustrating a joining method according to a fourth modification. As illustrated in FIG. 10, the fourth modification differs from the above-described second embodiment in that the stirring pin F2 is brought in contact with only an upper metal member 101G. The connection section F1 of the welding rotation tool F is apart from the front surface 101a of the upper metal member 101G. In the welding process of the fourth modification, while the stirring pin F2 contacts with only the upper metal member 101G, the insertion depth of the stirring pin F2 is set such that the plasticized region W formed by the friction stirring extends to a lower metal member 101H.

In the welding process of the fourth modification, while the insertion depth of the stirring pin F2 from the front surface of the upper metal member 101G toward the lap portion J11 with various heights is kept approximately constant, the friction stirring is performed. In such a case, the metal members 101G and 101H are plastically fluidized with frictional heat produced by the friction between the stirring pin F2 and the upper metal member 101G, thereby welding the metal members together at their surfaces on the lap portion J11.

In the above-described second embodiment and first to third modifications of the second embodiment, the welding process may be performed with the welding rotation tool F disposed in contact with only the upper metal member as in the fourth modification.

Fifth Modification

Figure 11:
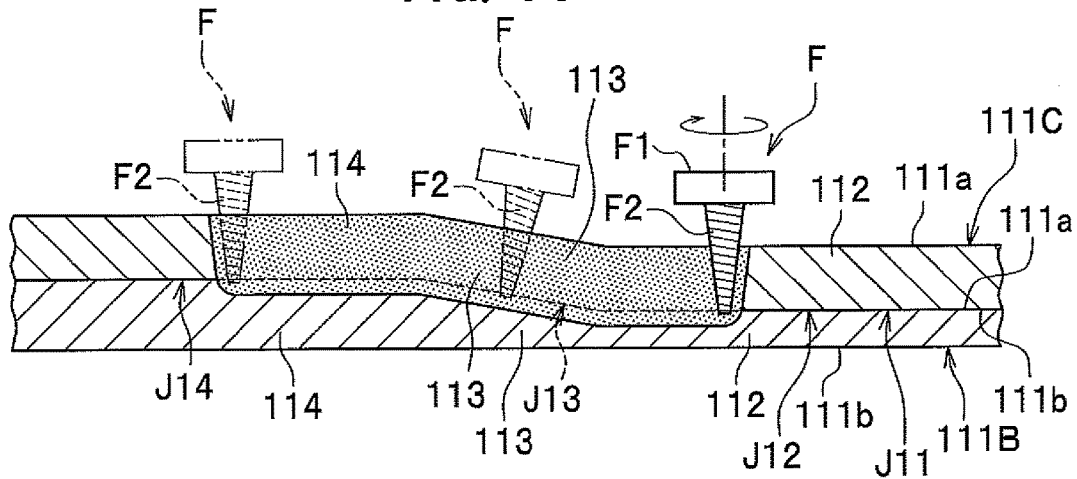
FIG. 11 is a longitudinal sectional view illustrating a joining method according to a fifth modification of the second embodiment.

FIG. 11 is a longitudinal sectional view illustrating a joining method according to the fifth modification of the second embodiment. The fifth modification differs from the second embodiment in that the friction stirring is performed with the welding rotation tool F disposed perpendicularly to the joint surfaces.

As illustrated in FIG. 11, in the stacking process of the fifth modification, the back surface 111b of an upper metal member 111C is disposed on the front surface 111a of the lower metal member 111B, thereby forming a lap portion J11 therebetween. In the welding process, the friction stirring is applied to the first flat lap portion J12 and the second flat lap portion J14 with the rotation central axis of the welding rotation tool F disposed in parallel with the vertical axis. On the other hand, the friction stirring is applied to the inclined lap portion J13 by inclining the welding rotation tool F to the vertical axis with the rotation central axis of the welding rotation tool F disposed perpendicularly to the joint surface of the inclined lap portion J13.

When the fifth modification is performed, for example, the friction stirring is performed by fitting the welding rotation tool F to a robot arm with a distal end provided with a rotation driving means such as a spindle unit. This friction stir apparatus facilitates changing an angle of the rotation central axis of the welding rotation tool F relative to the vertical axis. Thereby, even if the height of the lap portion J11 varies, changing the angle of the rotation central axis of the welding rotation tool F relative to the vertical axis enables the friction stirring to be continuously applied to the lap portion J11 with the welding rotation tool F always disposed perpendicularly to the lap portion J11 (boundary surface).

The fifth modification serves advantageous effects as approximately the same as those of the second embodiment. The angle of the rotation central axis of the welding rotation tool F relative to the vertical axis is changed. Thereby, the friction stirring is applied to the lap portion J11 (boundary surface) disposed at a deep position even if the lap portion serves as an inclined surface. If the joint surface is a curved surface, the friction stirring may be performed with the rotation central axis of the welding rotation tool F disposed in parallel to the normal line to the joint surfaces.

Third Embodiment

Figure 12:
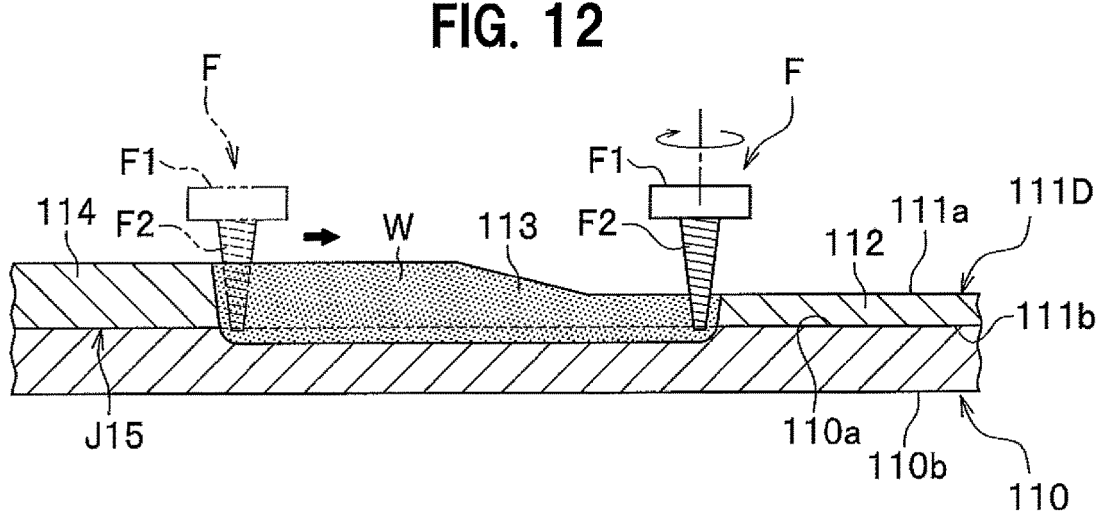
FIG. 12 is a longitudinal sectional view illustrating a joining method according to a third embodiment of the invention.

Next, the description will be given of the joining method according to the third embodiment of the invention. As illustrated in FIG. 12, the third embodiment differs from the second embodiment in that the height of only the front surface 111a of a metal member 111D for inserting the welding rotation tool F varies.

As illustrated in FIG. 12, in this embodiment, the metal member 111D is stacked on a metal member 10, forming a lap portion J15 therebetween. Applying friction stirring to the lap portion J15 results in welding the metal members 110 and 111D together at their surfaces on the lap portion J15. On the other hand, the metal member 110 serves as a plate member formed with a constant thickness.

On the other hand, the metal member 111D corresponds to the lower metal member 111B according to the third modification of the second embodiment. The front surface 111a of the metal member 111D is formed with various heights. The back surface 111b of the metal member 111D is flat.

In the joining method according to this embodiment, a stacking process and a welding process are performed. The stacking process serves as a process for stacking the lower metal member 110 and the upper metal member 111D on each other with the former's front surface 110a and the latter's back surface 111b in contact. The front surface 110a of the lower metal member 110 and the back surface 111b of the upper metal member 111D are brought in contact with each other, thereby forming a lap portion J15 therebetween. The lap portion J15 has a constant height position.

The welding process serves as a process for applying a friction stirring to the lap portion J15 by use of the welding rotation tool F. In the welding process, the welding rotation tool F rotating clockwise is inserted from the front surface 111a of the upper metal member 111D, and is moved relatively on the front surface 111a of the metal member 111D. The friction stirring is applied to a metal around the lap portion J15 by the welding process, thereby welding the metal members 110 and 111D together. On the traveling locus of the welding rotation tool F, a plasticized region W is formed.

The insertion depth of the stirring pin F2 may be set such that the plasticized region W formed by the friction stirring extends at least to the lap portion J15. In this embodiment, this insertion depth is set such that the distal end of the stirring pin F2 contacts with the lower metal member 110.

In the welding process according to this embodiment, the friction stirring is applied to the lap portion J15 between the metal members 110 and 111D with only the stirring pin F2 disposed in contact with the metal members 110 and 111D while the insertion depth of the stirring pin F2 from the front surface of the metal member 111d toward the lap portion J15 (metal member 110) is kept approximately constant. The connection section F1 of the welding rotation tool F is apart from the front surface 111a of the upper metal member 111D during the friction stirring.

According to the joining method of the above-described embodiment, there are not any cases in which a shoulder section would contact with a metal member. Even if the height of the front surface 111a of the metal member 111D varies, the stirring pin F2 is easily inserted to the lap portion J15. This insertion makes it possible to securely weld the metal members 111D and 110 together at their surfaces on the lap portion. That is, even if the front surface 111a of the metal member 111D for inserting the welding rotation tool F has an upward inclination (upward gradient) or a downward inclination (downward gradient), the operability of the welding rotation tool F is enhanced.

The friction stirring is performed with only the stirring pin F2 disposed in contact with the metal members 110 and 111D, which reduces a load exerted on the friction stir apparatus. This makes it possible to apply the friction stirring to the lap portion J15 disposed at a deep position without exerting a large load on the friction stir apparatus.

In the welding process, the friction stirring is performed by bringing the distal end of the stirring pin F2 in contact with (into) the lower metal member 110, thereby securely welding the metal members together at their surfaces on the lap portion J15.

In the above-described embodiment, the friction stirring is performed by bringing the stirring pin F2 in contact with both the metal members 110 and 111D. On the other hand, the welding process may be performed by bringing the stirring pin F2 in contact with only the metal member 111D for inserting the welding rotation tool F. In this case, the metal members 110 and 111D are plastically fluidized with frictional heat produced by the friction between the stirring pin F2 and the upper metal member 111D, thereby welding the metal members together at their surfaces on the lap portion J15.

In this embodiment, a part (inclined section 113) of the front surface 111a of the upper metal member 111D serves as an inclined surface. In addition, the invention may be also applied to a curved surface. The invention may be also applied to contiguous inclined surfaces or curved surfaces of the upper metal member.

The above-description is given of the second embodiment, the third embodiment, and the modifications. On the other hand, appropriate design changes are possible within the scope of the invention. For example, before the welding process is performed, the friction stirring may be applied to the metal members in a transverse direction by use of a small-sized rotation tool or a temporary welding process may be performed with a welding. This prevents the lap portions J11 and J15 from opening during the welding process.

When the welding process is performed, tab members may be disposed at the both ends of the lap portion, respectively. Each tab member may be set to have a start position and an end position for friction stirring on the surface. When the welding process finishes, the tab members may be cut off. This enhances the operability of the welding process. Performing the welding process with the tab members makes it possible to finely finish the side surfaces of the metal members.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A joining method comprising:
a butting process configured to butt a first metal member and a second metal member each having a front surface with various heights against each other to form therebetween a butt portion with varying heights, wherein the butt portion includes at least two flat sections, at least one upward inclined section and at least one downward inclined section; and
a welding process configured to apply a friction stirring to the butt portion by a stirring pin of a rotation tool, the stirring pin being maintained at a constant insertion depth with respect to at least one of the first and the second metal member across the flat sections and said upward and downward inclined sections of the butt portion,
wherein only the stirring pin contacts both the first metal member and the second metal member at the insertion depth generating only frictional heat and the stirring pin has a tapered shape so as to have a smaller diameter in a hanging down direction and includes only one outer circumferential surface having only one continuous spiral groove engraved only in the outer circumferential surface engaging the first metal member and the second metal member, and
wherein the spiral groove extends counterclockwise from a proximal end side to a distal end side of the outer circumferential surface of the stirring pin, while the rotation tool rotates clockwise, and the spiral groove extends clockwise from a proximal end side to a distal end side of the outer circumferential surface of the stirring pin, while the rotation tool rotates counterclockwise.

2. A joining method comprising:
a stacking process configured to stack a first metal member on a second metal member, with a back surface of the first metal member in contact with a front surface of the second metal member, to form a lap portion therebetween, the first metal member having various heights at least at the back surface thereof, the second metal member having various heights at least at the front surface thereof, wherein the lap portion includes at least two flat sections, at least one upward inclined section and at least one downward inclined section; and a welding process configured to insert a stirring pin of a rotation tool into the first metal member from a front surface of the first metal member toward the lap portion and apply a friction stirring to the lap portion by the stirring pin of the rotation tool, the stirring pin being maintained at a constant insertion depth with respect to at least one of the first and the second metal member across the flat sections and said upward and downward inclined sections of the lap portion, wherein only the stirring pin contacts both the first metal member and the second metal member at the insertion depth generating only frictional heat and the stirring pin has a tapered shape so as to have a smaller diameter in a hanging down direction and includes only one outer circumferential surface having only one continuous spiral groove engraved only in the outer circumferential surface engaging the first metal member and the second metal member, and wherein the spiral groove extends counterclockwise from a proximal end side to a distal end side of the outer circumferential surface of the stirring pin, while the rotation tool rotates clockwise, and the spiral groove extends clockwise from a proximal end side to a distal end side of the outer circumferential surface of the stirring pin, while the rotation tool rotates counterclockwise.

3. The joining method according to claim 1, wherein a friction stirring is performed with a rotation center axis of the rotation tool always disposed in parallel with the vertical axis.

4. The joining method according to claim 2, wherein a friction stirring is performed with a rotation center axis of the rotation tool always disposed in parallel with the vertical axis.

5. The joining method according to claim 1, wherein a friction stirring is performed with a rotation center axis of the rotation tool always disposed perpendicularly to joint surfaces.

6. The joining method according to claim 2, wherein a friction stirring is performed with a rotation center axis of the rotation tool always disposed perpendicularly to a boundary surface of the lap portion.

* * * * *